US007359072B2

(12) United States Patent
Isozaki et al.

(10) Patent No.: US 7,359,072 B2
(45) Date of Patent: Apr. 15, 2008

(54) PRINTING APPARATUS

(75) Inventors: Atsushi Isozaki, Nagoya (JP); Hiroshi Kuno, Oogaki (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 965 days.

(21) Appl. No.: 10/395,141

(22) Filed: Mar. 25, 2003

(65) Prior Publication Data

US 2003/0184790 A1 Oct. 2, 2003

(30) Foreign Application Priority Data

Mar. 27, 2002 (JP) ............................ 2002-089202

(51) Int. Cl.
*G06F 15/00* (2006.01)

(52) U.S. Cl. ...................... 358/1.14; 358/1.15; 399/24; 399/29; 347/19

(58) Field of Classification Search ............... 358/1.14, 358/1.15; 399/24, 29; 347/19
See application file for complete search history.

(56) References Cited

U.S. PATENT DOCUMENTS

| | | | | |
|---|---|---|---|---|
| 5,724,157 | A * | 3/1998 | Otani et al. | 358/450 |
| 5,930,463 | A * | 7/1999 | Park | 358/1.14 |
| 5,975,688 | A * | 11/1999 | Kanaya et al. | 347/86 |
| 6,155,729 | A * | 12/2000 | Ishida et al. | 400/234 |
| 6,212,338 | B1 | 4/2001 | Hagihara et al. | |
| 6,488,352 | B1 * | 12/2002 | Helterline et al. | 347/19 |
| 6,497,469 | B1 * | 12/2002 | Shinada et al. | 347/19 |
| 6,502,916 | B1 * | 1/2003 | Naka | 347/14 |
| 6,546,212 | B1 * | 4/2003 | Ogata et al. | 399/24 |
| 6,658,219 | B1 * | 12/2003 | Ito et al. | 399/27 |

FOREIGN PATENT DOCUMENTS

| | | |
|---|---|---|
| EP | 1 041 455 A2 | 10/2000 |
| EP | 1 053 885 A1 | 11/2000 |
| JP | A 1-290486 | 11/1989 |
| JP | A 11-237816 | 8/1999 |
| JP | A 11-243465 | 9/1999 |
| JP | A 2000-158777 | 6/2000 |
| JP | A 2000-284581 | 10/2000 |
| JP | A 2001-22230 | 1/2001 |
| JP | A 2001-105625 | 4/2001 |
| JP | A 2003-122204 | 4/2003 |
| WO | WO00/32406 | 6/2000 |

* cited by examiner

*Primary Examiner*—Twyler Lamb
*Assistant Examiner*—Mark R. Milia
(74) *Attorney, Agent, or Firm*—Oliff & Berridge, PLC

(57) ABSTRACT

A facsimile apparatus detects whether or not an ink ribbon internally mounted in an ribbon cassette amounted to the facsimile apparatus is a standard ink ribbon. When the apparatus detects a non-standard ink ribbon, the apparatus notifies a user by printing a message informing that the presently-mounted ink ribbon is a non-standard one and that printing function with the presently-mounted ink ribbon will be disabled after elapse of an allowable time.

21 Claims, 9 Drawing Sheets

35a

| DETECTION TIME NUMBER n | ALLOWABLE PERIOD t |
|---|---|
| 1 | t1 (ONE MONTH) |
| 2 | t2 (TWO WEEKS) |
| 3 | t3 (ONE WEEK) |
| 4 | t4 (THREE DAYS) |
| 5 OR MORE | t5 (ONE DAY) |

FIG.9

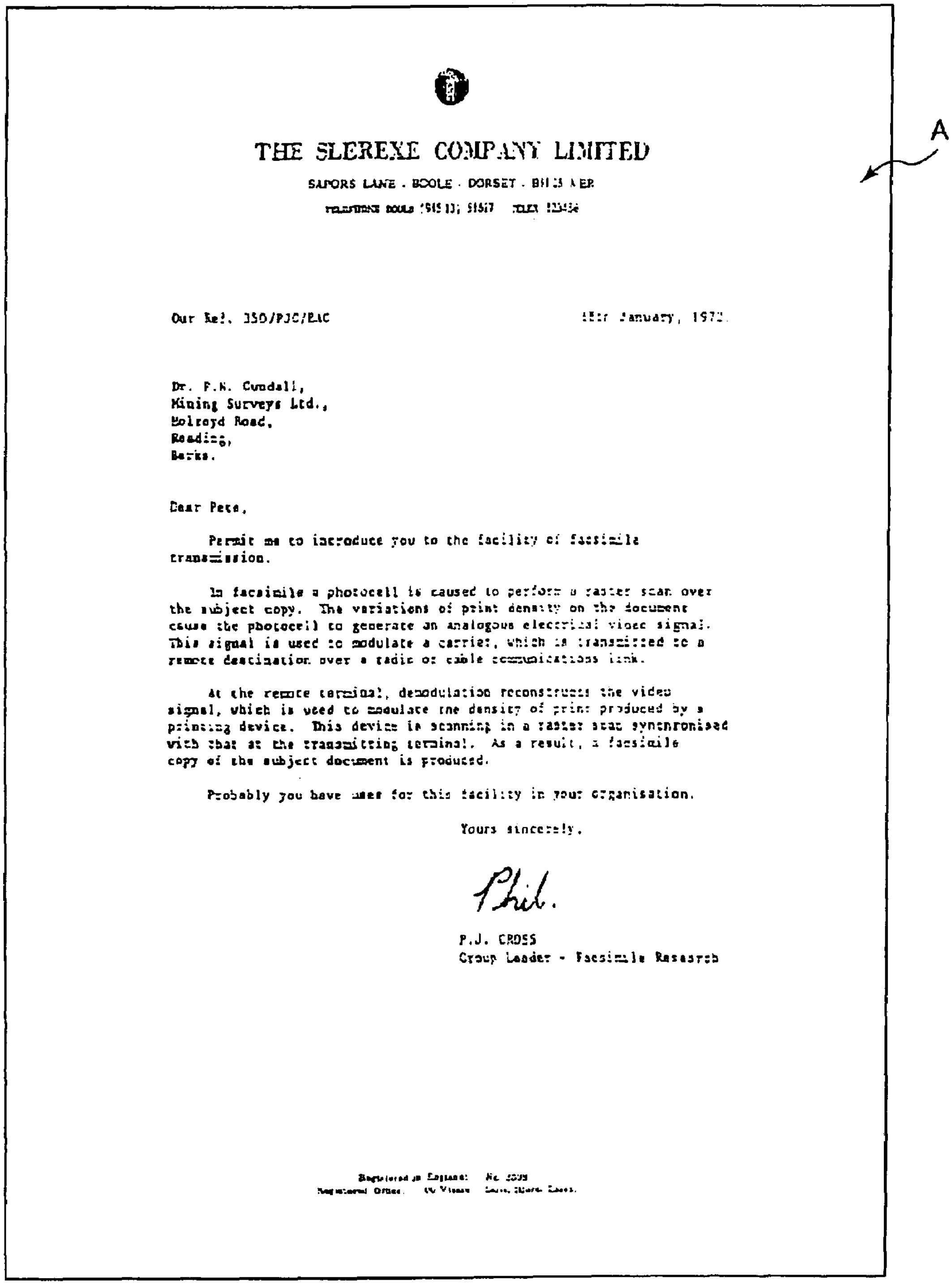

THE SLEREXE COMPANY LIMITED

SAPORS LANE - BOOLE - DORSET - BH 25 8 ER

TELEPHONE BOOLE (945 13) 51617 - TELEX 123456

Our Ref. 350/PJC/EAC 18th January, 1972.

Dr. P.N. Cundall,
Mining Surveys Ltd.,
Holroyd Road,
Reading,
Berks.

Dear Pete,

Permit me to introduce you to the facility of facsimile transmission.

In facsimile a photocell is caused to perform a raster scan over the subject copy. The variations of print density on the document cause the photocell to generate an analogous electrical video signal. This signal is used to modulate a carrier, which is transmitted to a remote destination over a radio or cable communications link.

At the remote terminal, demodulation reconstructs the video signal, which is used to modulate the density of print produced by a printing device. This device is scanning in a raster scan synchronised with that at the transmitting terminal. As a result, a facsimile copy of the subject document is produced.

Probably you have uses for this facility in your organisation.

Yours sincerely,

Phil.

P.J. CROSS
Group Leader - Facsimile Research

Registered in England: No. 2038
Registered Office: 60 Vicara Lane, Ilford. Essex.

A

FIG.10

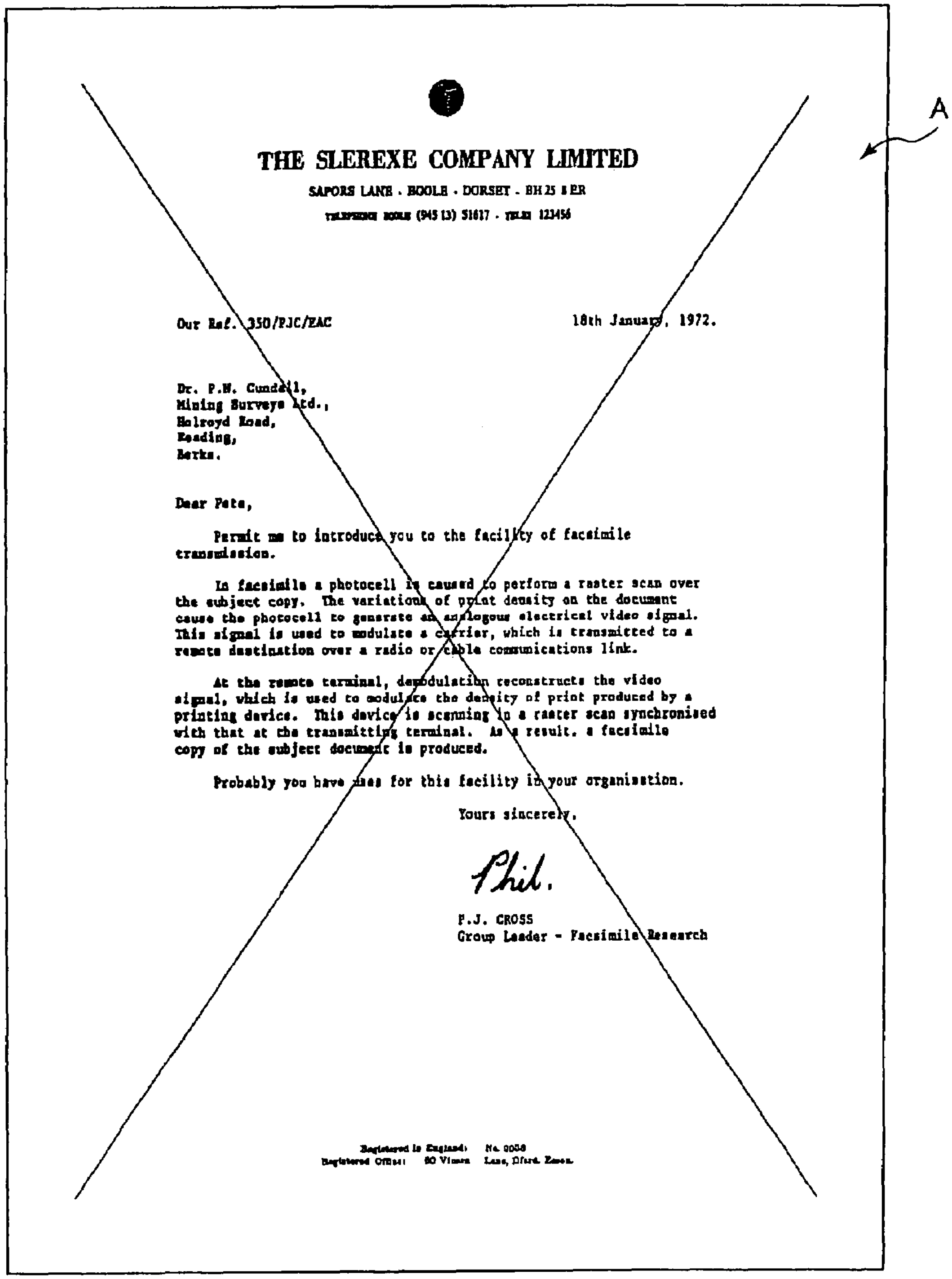

THE SLEREXE COMPANY LIMITED

SAPORS LANE - BOOLE - DORSET - BH 25 8 ER

TELEPHONE BOOLE (945 13) 51617 - TELEX 123456

Our Ref. 350/PJC/EAC 18th January, 1972.

Dr. P.N. Cundall,
Mining Surveys Ltd.,
Holroyd Road,
Reading,
Berks.

Dear Pete,

Permit me to introduce you to the facility of facsimile transmission.

In facsimile a photocell is caused to perform a raster scan over the subject copy. The variations of print density on the document cause the photocell to generate an analogous electrical video signal. This signal is used to modulate a carrier, which is transmitted to a remote destination over a radio or cable communications link.

At the remote terminal, demodulation reconstructs the video signal, which is used to modulate the density of print produced by a printing device. This device is scanning in a raster scan synchronised with that at the transmitting terminal. As a result, a facsimile copy of the subject document is produced.

Probably you have uses for this facility in your organisation.

Yours sincerely,

Phil.

P.J. CROSS
Group Leader - Facsimile Research

Registered in England: No. 2038
Registered Office: 60 Vicara Lane, Ilford. Essex.

PRINTING APPARATUS

BACKGROUND OF THE INVENTION

1. Field of the Invention

The present invention relates to a printing apparatus such as a facsimile apparatus.

2. Description of Related Art

Conventionally, there is known a facsimile apparatus that performs printing with a thermal transfer system. The facsimile apparatus of this type uses an ink ribbon wound in a roll shape.

For this facsimile apparatus, a standard ink ribbon, which is applicable to the facsimile apparatus and whose characteristics, such as durability and quality, satisfy a predetermined standard, is manufactured by a manufacturer of facsimile apparatuses or a manufacturer of ink ribbons, and supplied to consumers to ensure that a print operation can be performed satisfactorily.

That is, usually, the facsimile apparatus is constituted so that its product quality is guaranteed assuming that a standard ink ribbon satisfying the above-mentioned standard of characteristics is mounted. Therefore, if a non-standard ink ribbon, which is not determined as the standard ink ribbon and therefore whose characteristic may possibly fail to satisfy the standard is used, a satisfactory print quality will not possibly be attained in the facsimile apparatus and, moreover, a print head provided in the facsimile apparatus will possibly be affected adversely, a service life of the ink head will possibly be reduced, or jam of the ink ribbon will possibly occur. In addition, even if a standard ink ribbon whose usable term has expired long time ago is used, even if the ink ribbon is a standard one, the quality characteristics of the ink ribbon possibly changes and causes the above-described deficiencies.

SUMMARY OF THE INVENTION

In such a facsimile apparatus, when a non-standard ink ribbon is mounted in the facsimile apparatus, a display section is controlled to show that a non-standard ink ribbon is now being presently mounted. This fails to inform a user of this fact appropriately and sufficiently.

It is preferable that a user can grasp various information of an ink ribbon mounted on the apparatus in order to attain his/her desired printing performance.

In view of the above-described drawbacks, it is an objective of the present invention to provide a printing apparatus which, when a non-standard ink ribbon is mounted in the apparatus, can inform a user of this appropriately and sufficiently.

It is another object of the present invention is to notify a user of information on a presently-mounted ink ribbon, thereby enabling the user to attain his/her desired printing performance.

In order to attain the above and other objects, the present invention provides a printing apparatus, comprising: a mounting unit, in which a printing component is detachably mounted, the printing component being detachably mounted with a consumable item and having a storage portion storing information of the consumable item; a printing unit that uses the consumable item in the printing component mounted in the mounting section to execute printing operation; a detecting unit detecting the information stored in the storage portion and executing a judging operation based on the detected information; and a printing-notifying unit that prints a message selectively based on the judged result, the message showing the judged result, thereby informing a user of the nudged result.

BRIEF DESCRIPTION OF THE DRAWINGS

The above and other objects, features and advantages of the invention will become more apparent from reading the following description of the preferred embodiments taken in connection with the accompanying drawings in which:

FIG. 9 shows another example of a printing result in the special print processing; and FIG. 10 shows another example of a printing result in the special print processing.

DETAILED DESCRIPTION OF THE PREFERRED EMBODIMENT

Figure 1:
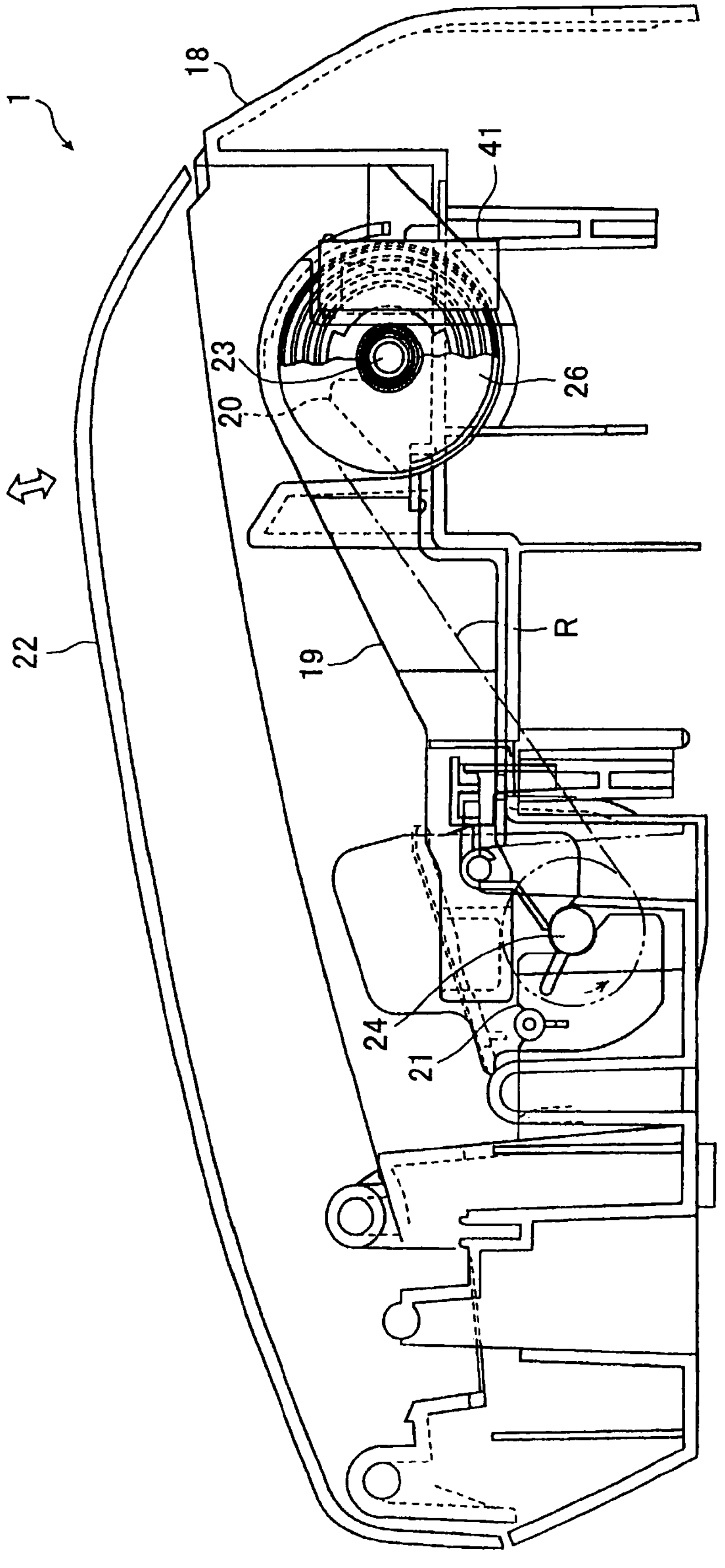
FIG. 1 is a schematic diagram showing the internal structure of a facsimile apparatus according to a preferred embodiment of the present invention.

A printing apparatus according to a preferred embodiment of the present invention will be described while referring to the accompanying drawings wherein like parts and components are designated by the same reference numerals to avoid duplicating description.

<Structure of the Facsimile Apparatus>

The facsimile apparatus 1 is provided with a plurality of functions such as a printing function, an image reading function (scanner function), and an image communication function. In this embodiment, the printing function is of a thermal transfer system. In order to send facsimile data, the facsimile apparatus 1 reads an original using the image reading function and sends the read original data to a destination by using the communication function. When receiving facsimile data by using the communication function, the facsimile apparatus 1 prints contents of the facsimile data on a recording sheet using the printing function. The facsimile apparatus 1 can be utilized as a printer or a scanner independently from a personal commuter in a state that the facsimile apparatus 1 is connected to the personal computer or the like. In addition, the facsimile apparatus 1 can also be utilized as a copying machine by operating the printing function and the image reading function in association with each other.

Figure 4:
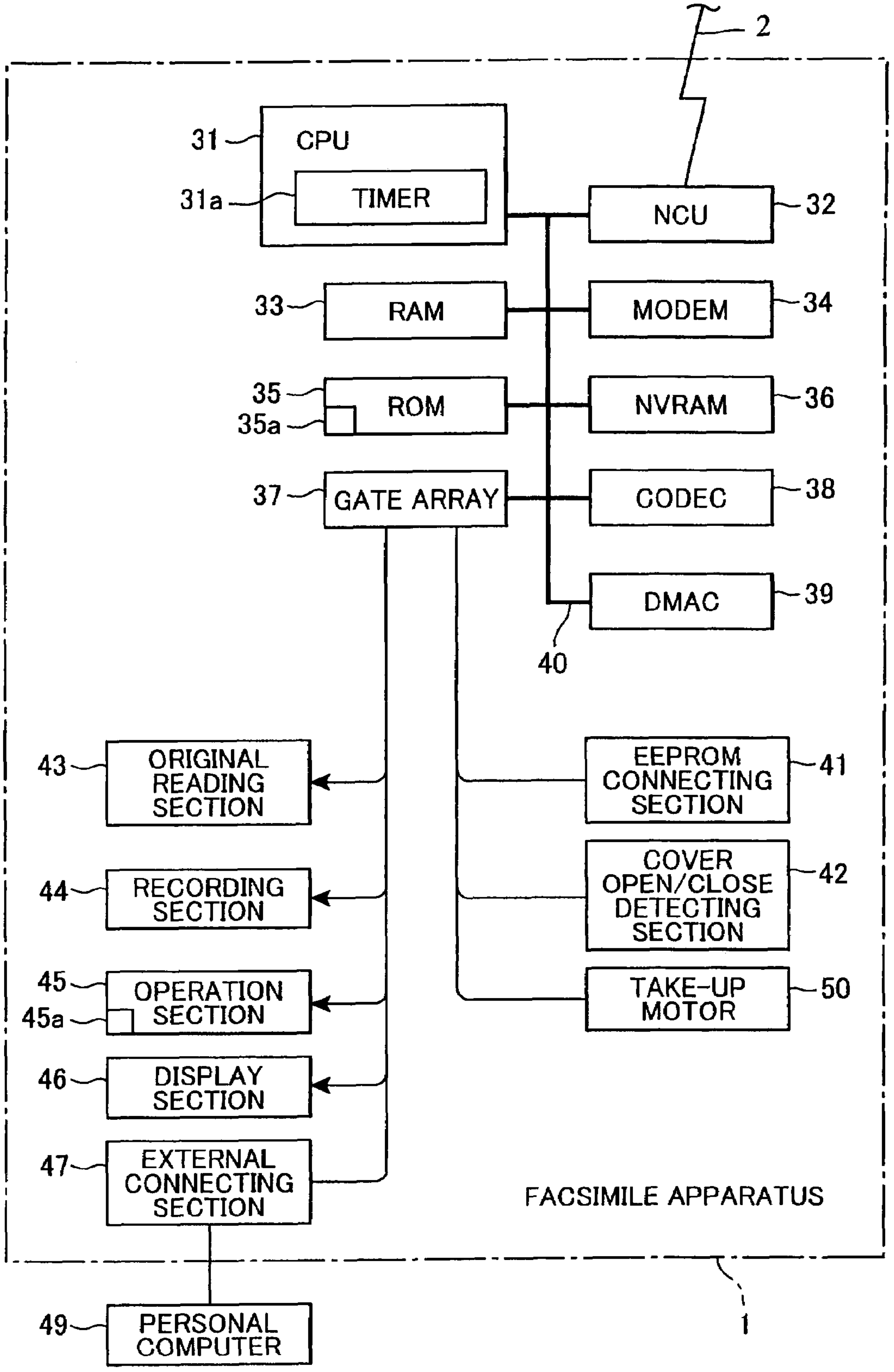
FIG. 4 is a block diagram showing an electric configuration of the facsimile apparatus shown in FIG. 1.

As shown in FIG. 1, this facsimile apparatus 1 has an apparatus main body 18. Bearings 20, 21 are provided in the apparatus main body 18. The bearings 20, 21 are for detachably mounting a ribbon cassette 19 thereon. A main body cover 22 is provided above the apparatus main body 18 so as to be freely opened and closed. The main body cover 22 is a cover for protecting the inside of the apparatus 1. The facsimile apparatus 1 is provided with a cover open/close detection section 42 (FIG. 4). The cover open/close detection section is for detecting open and close of the main body cover 22.

Figure 2B:
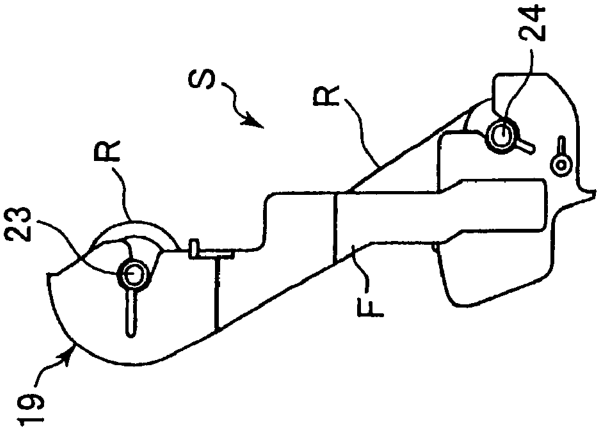
FIG. 2B is a side view of the ribbon cassette of FIG. 2A.
Figure 2A:
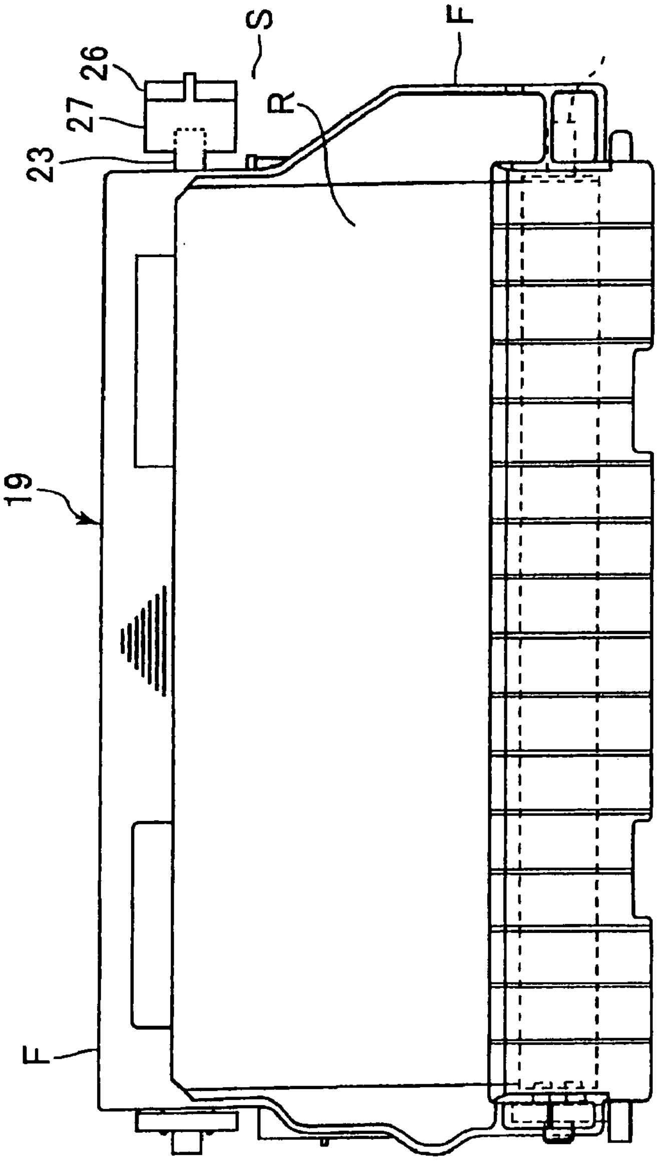
FIG. 2A is a plan view showing an external configuration of a ribbon cassette, in which a ribbon set having an ink ribbon is incorporated.

As shown in FIGS. 2A and 2B, an ink ribbon set S is composed of an ink ribbon R, a supply shaft 23, and a winding (take-up) shaft 24. The ink ribbon R is wound around both the shafts 23, 24. The supply shaft 23 is for supplying the ink ribbon R. The winding shaft 24 is for winding or taking up the ink ribbon R around it.

The ink ribbon cartridge 19 has a cartridge frame F, to which the ink ribbon set S is detachably mounted in a manner that the supply shaft 23 and the winding shaft 24 are rotatably supported by the frame F. This construction makes it easy to replace the ink ribbon cartridge 19 mounted to the facsimile apparatus 1 with a new one. When it is desired to replace the ink ribbon R with a new one, a user can perform the replacement not only by purchasing the whole of a new ink ribbon cartridge 19 but also by purchasing only a new ink ribbon set S but reusing the cartridge frame F.

Figure 3A:
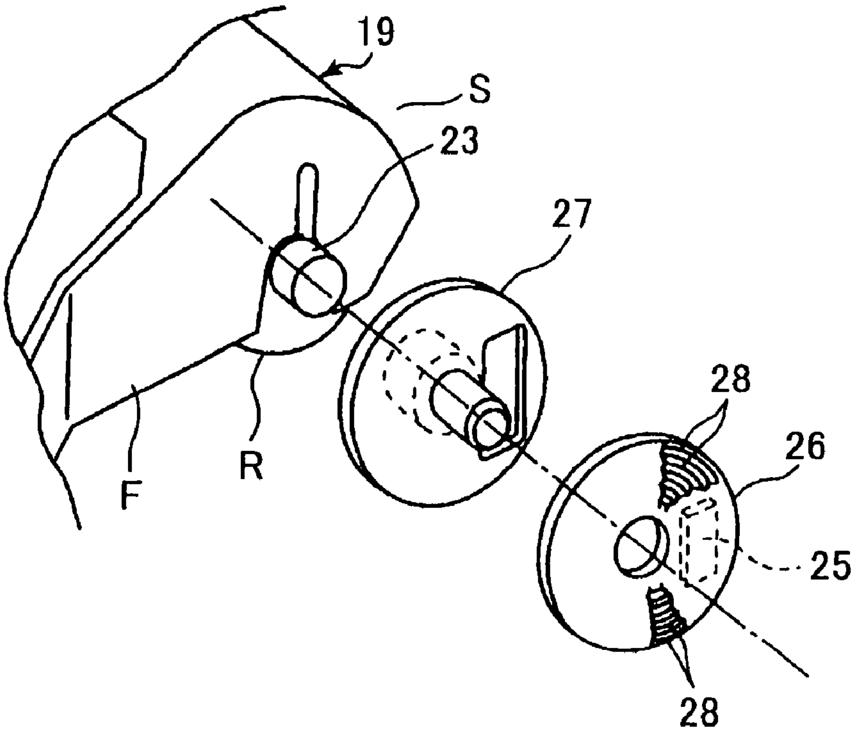
FIG. 3A is an external perspective view showing how a piece of substrate, on which an EEPROM is provided, is being mounted onto a ribbon set.
Figure 3B:
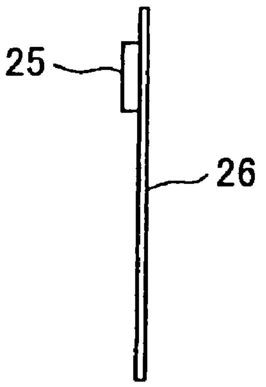
FIG. 3B is a side view showing the piece of substrate of FIG. 3A.

As shown in FIG. 3A, a spool 27 is fitted to one end of the supply shaft 23. A piece of substrate 26 is attached to the spool 27. As shown in FIGS. 3A and 3B, an EEPROM 25 is provided on the back side of the piece of substrate 26.

When the ribbon cassette 19 is mounted in the facsimile apparatus main body 18, the other end of the supply shaft 23, which is opposite to the end of the supply shaft 23 where the spool 27 is fitted, is coupled to a tension motor (not shown), and one end of the winding shaft 24 is coupled to the take-up motor 50 (FIG. 4). The tension motor is for giving a tension to the ink ribbon R. The winding motor 50 is for driving to rotate the winding shaft 24 to take up the ink ribbon R around the shaft 24. The take-up motor 50 is, for example, a stepping motor, and is driven to rotate according to pulse signals supplied from a CPU 31.

The EEPROM 25 is a memory storing a set of ribbon-ID (ribbon-Identification) data of the ink ribbon R. It is noted that a manufacturer of the ink ribbon R determines a set of ribbon-ID data for the ink ribbon R before shipping the ribbon R from the manufacturer. The ribbon-ID data is for identifying the subject ink ribbon R. The ribbon-ID data is composed of numerals of several digits or a string of characters in this example, the ribbon-ID data is eight to ten bits of data indicative of a manufacture-lot number and a serial number specifying the subject ink ribbon R.

Figure 3C:
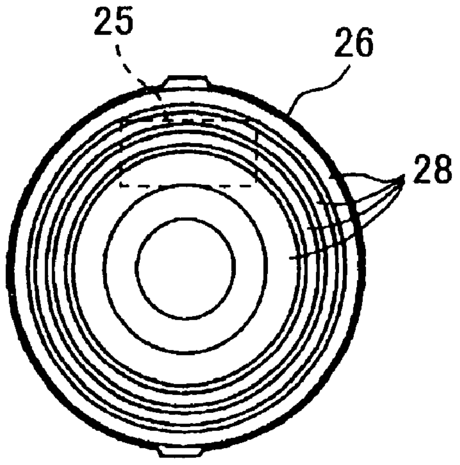
FIG. 3C is a front view of the piece of substrate of FIG. 3A.

As shown in FIGS. 3A and 3C, a plurality of conductor patterns 28 are formed on a surface on the front side of the piece of substrate 26, which is opposite to the back side, on which the ESPROM 25 is provided. The plurality of conductor patterns 28 are electrically connected with a plurality of terminals (not shown) of the EEPROM 25. The respective conductor patterns 28 are formed substantially in shapes of concentric rings and formed in the order of a power supply line, a control signal line, and a data signal line from an outer edge to an inside of the piece of substrate 26.

As shown in FIG. 1, an EEPROM connecting section 41 is provided on the apparatus main body 18 side of the facsimile apparatus 1 at a position that confronts the front side of the piece of substrate 26 when the ribbon cassette 19 is mounted in the apparatus main body 18. This EEPROM connecting section 41 has a plurality of contact-point terminals (not shown), each of which is for contacting with a corresponding conductor pattern 28 on the substrate 26. The contact-point terminals will come into contact with the respective conductor patterns 28 when the ribbon cassette 19 is mounted in the apparatus main body 1B.

<Electric Configuration of the Facsimile Apparatus>

As shown in FIG. 4, the facsimile apparatus 1 is provided with the CPU 31, an NCU 32, a RAM 33, a modem 34, a ROM 35, an NVRAM (nonvolatile RAM) 36, a gate array 37, a codec 38, and a DMAC 39, which are connected with one another by a bus 40. The bus 40 has an address bus, a data bus, and a control signal line. The EEPROM connecting section 41, the cover open/close detection section 42, the take-up motor 50, an original reading section 43, a recording section 44, an operation section 45, a display section 46, and an external connection section 47 are connected to the gate array 37. The public telephone line 2 is connected to the NCU 32, and a personal computer 49 is connected to the external connection section 47.

The CPU 31 controls operations of the entire facsimile apparatus 1,

The NCU 32 performs network control by being connected to the public telephone line 2. Facsimile data and the like can be received or sent by this network control.

The RAM 33 provides a work area or the like for the CPU 31.

The modem 34 performs modulation, demodulation, and the like of facsimile data.

The ROM 35 prestores therein various programs (such as programs of FIGS. 6 and 7) to be executed by the CPU 31.

The NVRAM 36 stores data and various kinds of information.

The gate array 37 functions as an interface between the CPU 31 and the respective sections 41 to 47, and 50. The codec 38 performs coding and decoding of facsimile data and the like. The DMAC 39 writes data in and reads it out from the RAM 33.

The EEPROM connecting section 41 is for reading the ribbon-ID from the EEPROM 25, which is attached to the ribbon set S. The EEPROM connecting section 41 can perform its reading operation because its contact-point terminals are connected to the conductor patterns 28 of the piece of substrate 26, on which the EEPROM 25 is provided. The CPU 31 can read data out from the EEPROM 25 and write data in the EEPROM 25 via the EEPROM connecting section 41.

The cover open/close detection section 42 is for detecting open and close of the main body cover 22. The cover open/close detection section 42 executes its detection mechanically, optically, electrically, or magnetically. The cover open/close detection section 42 transmits open/close signals indicative of the open/close state of the main body cover 22 to the CPU 31. The cover 22 is opened when the ribbon cassette 19 is detached from the apparatus 1 or when the ribbon cassette 19 is mounted into the apparatus 1.

The original reading section 43 is provided with, for example, an image sensor, an LED light source, and an original feed motor (all of which are not shown) and reads an image from a facsimile original or the like according to control of the CPU 31.

The recording section 44 prints an image such as characters or figures in monochrome or color by using the thermal system or the like.

The operation section 45 is provided with ten keys and various operation keys and transmits to the CPU 31 an input signal issued in response to a key operation of a user.

The operation section 45 has a power switch 45*a*. When a user turns on the power switch 45*a*, the power of the apparatus 1 is turned on.

The display section 46 is provided with, for example, a liquid crystal display, and displays an operating state, an operation guidance, and the like.

When this facsimile apparatus 1 is used as peripheral equipment, the external connection section 47 is connected to a personal computer 49, and exchanges data with the personal computer 49.

It is noted that many ink ribbon sets S, which are mounted with standard ink ribbons R and which are mountable in the ribbon cassette 19, are manufactured by a manufacturer of the facsimile apparatus 1 and by manufacturers of ink ribbons. The standard ink ribbons R are determined and confirmed by the facsimile-manufacturer as such ink ribbons whose characteristics, such as durability and quality, satisfy a predetermined standard required to attain a satisfactory print operation. Many other ink ribbon sets S, which are mounted with non-standard ink ribbons R but which are mountable in the ribbon cassette 19, are manufactured by other ribbon-manufacturers. The non-standard ink ribbons R are not confirmed by the facsimile-manufacturer, and therefore it is unknown whether the characteristics of the non-standard ink ribbons R satisfy the predetermined standard. The characteristics of the non-standard ink ribbons may possibly fail to satisfy the predetermined standard. When the non-standard ink ribbons are mounted in the facsimile apparatus 1, therefore, the facsimile apparatus 1 may possibly fail to attain the satisfactory printing operation.

According to the present embodiment, the CPU 31 has a timer 31*a* for measuring time.

The NVRAM 36 stores therein an ink ribbon flag and the number of non-standard detection times "n" that the present apparatus 1 has detected that a non-standard ink ribbon R is being mounted in the present apparatus 1. The ink ribbon flag indicates whether or not an ink ribbon R that is presently mounted in the apparatus 1 is a standard ink ribbon.

The ROM 35 stores therein reference data. The reference data includes a plurality of sets of ribbon-ID data for a plurality of standard ink ribbons R that will possibly be mounted in the ink ribbon cartridge 19 and mounted in the present apparatus 1. The reference data will be used as a reference when the apparatus 1 judges whether or not the ink ribbon R mounted in the apparatus 1 is a standard ink ribbon.

Figures 5, 6:
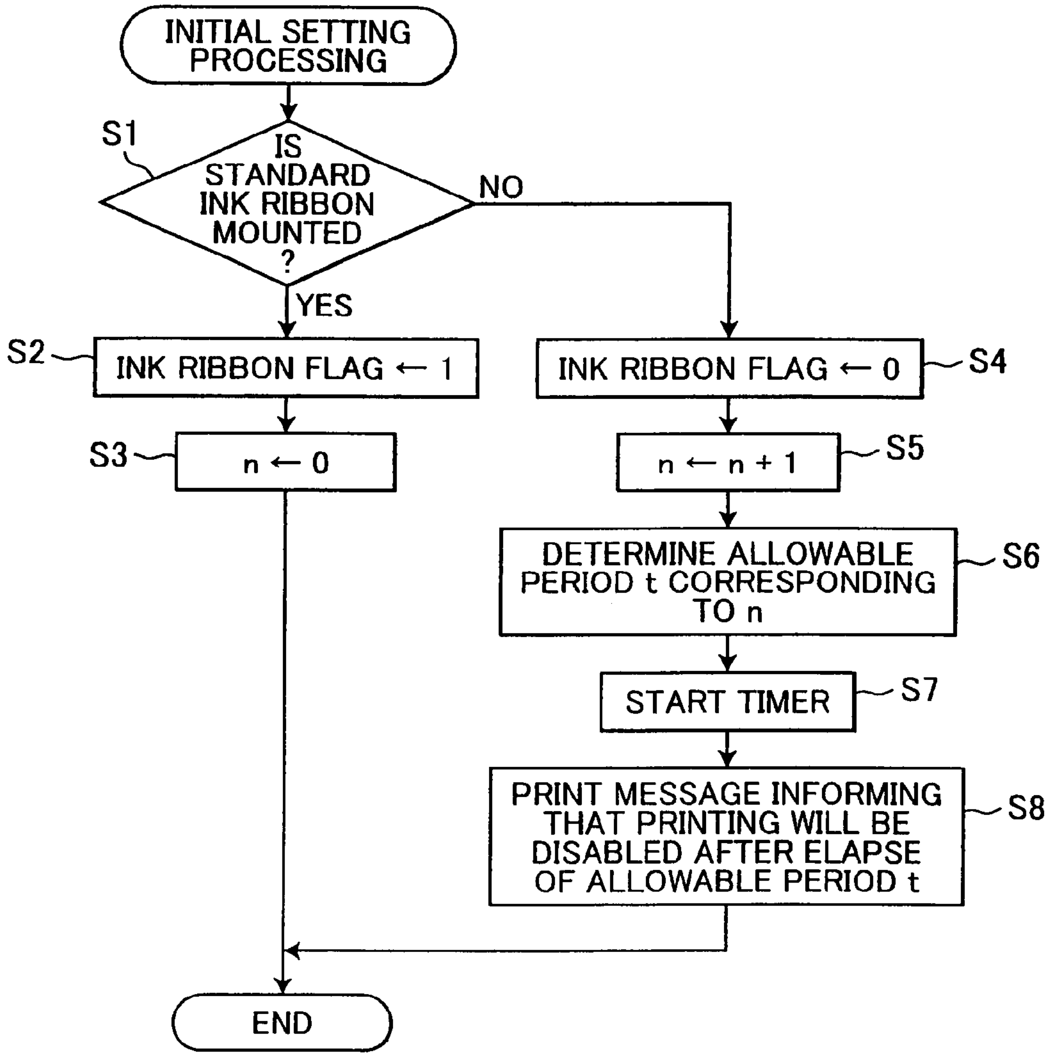
FIG. 5 shows a correspondence table provided in a ROM.
FIG. 6 is a flowchart showing initial setting processing executed by a CPU.

The ROM 35 further stores therein a correspondence table 35*a* shown in FIG. 5. The correspondence table 35*a* indicates a correspondence relationship between the number of non-standard detection times "n" that the apparatus 1 has detected a non-standard ink ribbon R and an allowable period of time "t" during which a non-standard ink ribbon R can be used.

According to the present embodiment, the apparatus 1 detects whether or not the ink ribbon R internally mounted in the ribbon cassette 19 is a standard ink ribbon that satisfies the predetermined standard for the characteristics of ink ribbons R. When the apparatus 1 detects that a non-standard ink ribbon is mounted in the apparatus 1, the apparatus 1 prints out a message to inform a user that the presently-mounted ink ribbon R is a non-standard one. Consequently, the user can recognize appropriately and sufficiently that the presently-used ink ribbon R is a non-standard ink ribbon.

The CPU 31 of the facsimile apparatus 1 executes an initial setting processing, shown in FIG. 6, when the power switch 45*a* is turned on. The CPU 31 of the facsimile apparatus 1 executes the initial setting processing also when the CPU 31 receives from the cover open/close detecting section 42 a detection signal indicative of that the main body cover 22 is closed from its opened state.

During the initial setting processing, the CPU 31 first reads out ribbon-ID data from the EEPROM 25, and judges whether or not the ink ribbon R is a standard ink ribbon based upon the ribbon-ID data (S1). More specifically, the CPU 31 reads out the ribbon-ID data of the presently-mounted ink ribbon R from the EEPROM 25. The CPU 31 also reads out the reference data from the ROM 35. The CPU 31 compares the ribbon-ID data of the subject ink ribbon R with the plurality of sets of ribbon-ID data in the ROM 35. The CPU 31 determines that the presently-mounted ink ribbon R is a standard ink ribbon if the ribbon-ID data of the presently-mounted ink ribbon R matches with one of the plurality of sets of ribbon-ID data. The CPU 31 determines that the presently-mounted ink ribbon R is not a standard ink ribbon but is a non-standard ink ribbon if the ribbon-ID data of the presently-mounted ink ribbon R does not match with any of the plurality of sets of ribbon-ID data. In this way, the CPU 31 performs ink ribbon detection in S1.

If the presently-mounted ink ribbon R is a standard ink ribbon (S1; YES), the CPU 31 sets an ink ribbon flag of "1" in the NVRAM 36 (S2). The ink ribbon flag "1" indicates that a presently-mounted ink ribbon R is a standard ink ribbon. Subsequently, the CPU 31 resets to "0" the number of times "n" that the CPU 31 has detected a non-standard ink ribbon (S3), and ends the initial setting processing.

On the other hand, if the ink ribbon is not a standard ink ribbon (S1: NO), the CPU 31 sets the ink ribbon flag to "0" (S4). The ink ribbon flag "0" indicates that a presently-mounted ink ribbon R is a non-standard ink ribbon. Subsequently, the CPU 31 adds "1" to the number of non-standard detection times "n" in the NVRAM 36 (S5).

Subsequently, the CPU 31 refers to the correspondence table 35*a* of FIG. 5, and reads out one allowable period value "t" that corresponds to the present number of non-standard detection times "n" (S6). The CPU 31 sets the length of the allowable period "t" to the read out value. Then, the CPU 31 starts measuring time by using the timer 31*a* (S7). For example, when the number of non-standard detection times "n" is one (n=1), the length of the usable period "t" is set to one month (t=t1).

Next, the CPU 31 prints in S8 on a sheet a message "A presently-used ink ribbon is not a standard ink ribbon. Unless the ink ribbon is changed to a standard ink ribbon, printing function will be disabled after the elapse of the usable period t". The user can recognize that printing function will be disabled after the elapse of the allowable period t. The CPU 31 then ends the initial setting processing.

In S8, simultaneously with printing the message, the CPU 31 may display the same or similar message on the display section 46 or may perform verbal guidance.

It is noted that when the power switch 45*a* is turned on again or when the main body cover 22 is closed from its opened state again, the initial setting process of FIG. 6 is executed again. At this time, if the non-standard ink ribbon is still being mounted on the apparatus 1, the number of the non-standard detection times "n" will increase by one. Accordingly, the length of the allowable period "t" will be updated according to the increased number of times of detection "n" as required by the correspondence table 35*a* of FIG. 5. For example, when the number of non-standard detection times "n" increases to two (n=1) in S5, the length of the allowable period t is decreased to two weeks (t=t2) in S6, and a message is printed in S8 to inform the user that printing will be disabled after the elapse of the allowable period t of two weeks. The user can easily recognize that the allowable period has been reduced. The user can decide to replace the presently-mounted ink ribbon R with a standard ink ribbon.

It is noted that the lengths of the allowable periods t in the correspondence table 35*a* of FIG. 5 can be modified to any other values. It is preferable, however that the lengths of the allowable periods t are set in the correspondence table 35*a* of FIG. 5 so that the value of the allowable period t will decrease in a stepwise manner as shown in FIG. 5 as the number of non-standard detection times t increases. By decreasing the allowable period t stepwisely as the number of non-standard detection times n increases, it is possible to effectively urge the user to change the presently-mounted non-standard ink ribbon into a standard ink ribbon.

In the above description, the correspondence table 35*a* of FIG. 5 stores, in correspondence with the several number of non-standard detection times n, the allowable time periods t, during which the printing operation is allowed to be executed. However, the correspondence table 35*a* of FIG. 5 may be modified to store, in correspondence with the several numbers of non-standard detection times n, allowable number of times, by which the printing operation is allowed to be executed. It is preferable that the allowable number of times are set in the correspondence table so that the allowable number of times decreases stepwise as increase of the number of non-standard detection times Alternatively, the correspondence table 35*a* of FIG. 5 may be modified to store, in correspondence with the several numbers of non-standard detection times n, printable number of sheets, onto which printing is allowed to be executed. It is preferable that the printable number of sheets are set in the correspondence table so that the printable number of sheets decreases stepwise as increase of the number of non-standard detection times.

Figure 7:
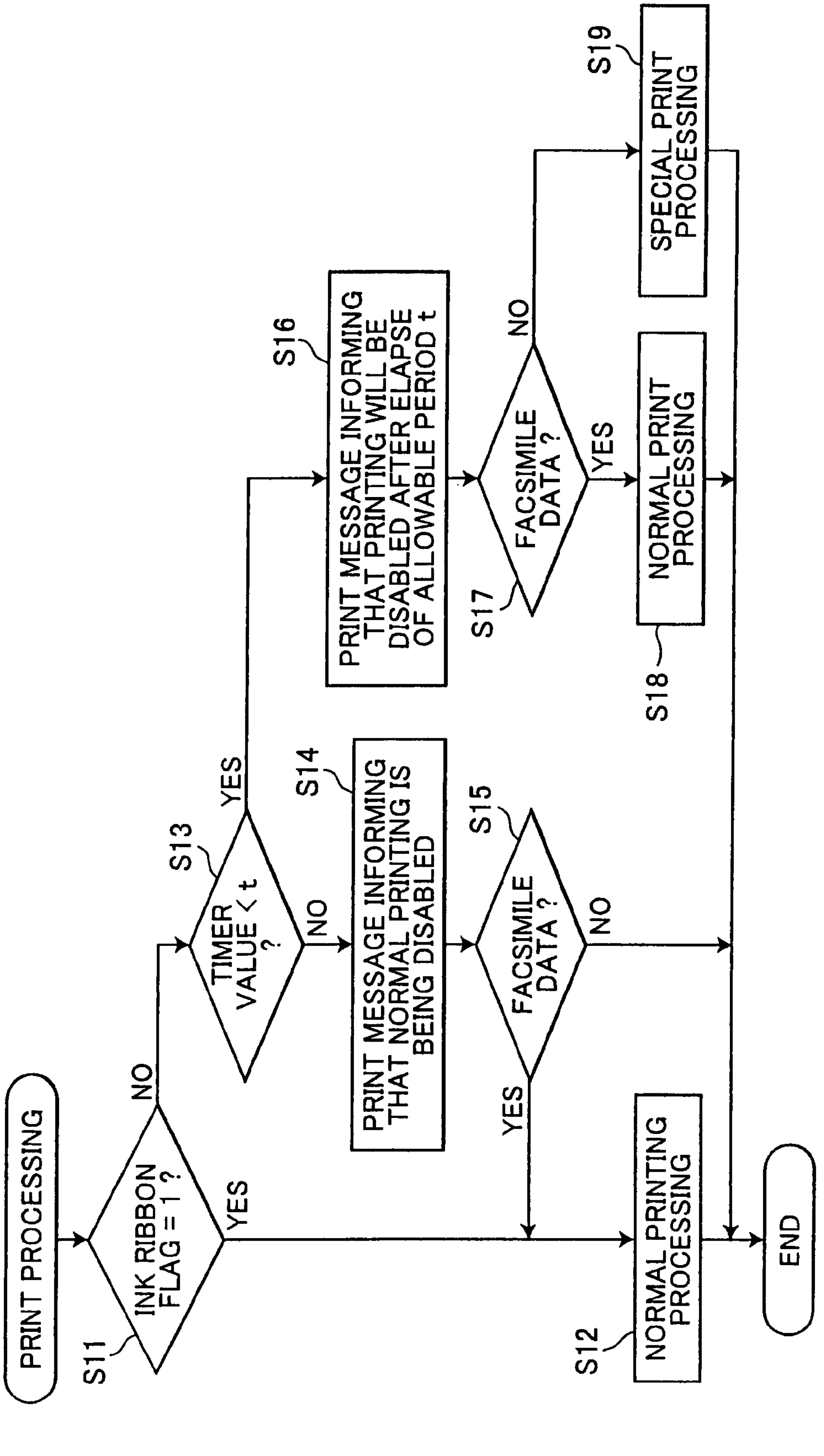
FIG. 7 is a flowchart showing print processing executed by the CPU.

The CPU 31 executes a print process as shown in FIG. 7 when the CPU 31 receives, from the personal computer 49, a print instruction and a set of print data indicative of an image desired to be printed. The CPU 31 executes a print process shown in FIG. 7 also when facsimile data arrives the facsimile apparatus 1 from outside.

During the printing process, the CPU 31 first judges whether or not the ink ribbon flag presently being stored in the NVRAM 36 is "1" (S11). If the ink ribbon flag is "1" (S11: YES), the CPU 31 knows that a standard ink ribbon R is now being mounted in the apparatus 1, and therefore performs normal print processing (S12) to print the print data or the facsimile data in a normal manner.

On the other hand, if the ink ribbon flag is "0" (S11: NO), the CPU 31 knows that a non-standard ink ribbon R is now being mounted in the apparatus 1. Accordingly, the CPU 31 judges whether or not the present value of the timer 31*a* is smaller than the length "t" of the allowable period (S13). If the value of the timer 31*a* is larger than or equal to the length "t" of the allowable period (S13: no), it is known that the allowable period t has already elapsed. Accordingly, the CPU 31 prints out a message on a sheet of paper to inform the user that normal printing is now being prohibited (S14). The user recognizes that printing is disabled according to the presently-mounted non-standard ink ribbon.

Next, in S15, the CPU 31 judges whether or not data intended to be printed during the present printing process is facsimile data. If the present printing process starts upon receipt of incoming facsimile data and therefore is facsimile data is to be printed (S15: YES), the CPU 31 executes normal print processing in S12. On the other hand, if the data is not facsimile data but print data supplied from the personal computer 49 is to be printed (S15: NO), the CPU 31 ends the present processing without performing the print processing.

In this way, the present apparatus 1 can always print incoming facsimile data regardless of whether or not the allowable period of time t has elapsed. It is possible to prevent troubles that will possibly occur when the apparatus 1 does not print out incoming facsimile that includes urgent information.

On the other hand, if the value of the timer 31*a* is smaller than the value t of the allowable period (S13: YES), that is, if the allowable period t has not yet elapsed, the CPU 31 prints a message informing the user that printing will be disabled after the elapse of the allowable period t (S16). The user can recognize that printing will be disabled after elapse of the allowable period t unless the ink ribbon is changed to a standard ink ribbon.

Thereafter, the CPU 31 judges whether or not the data to be printed is facsimile data (517). If facsimile data is to be printed now (S17: YES), the CPU 31 performs the normal print processing (518) in the same manner as in S12.

On the other hand, if print data from the personal computer 49 is to be printed (S17: NO), the CPU 31 performs in S19 special print processing other than the normal print processing.

Figure 8:
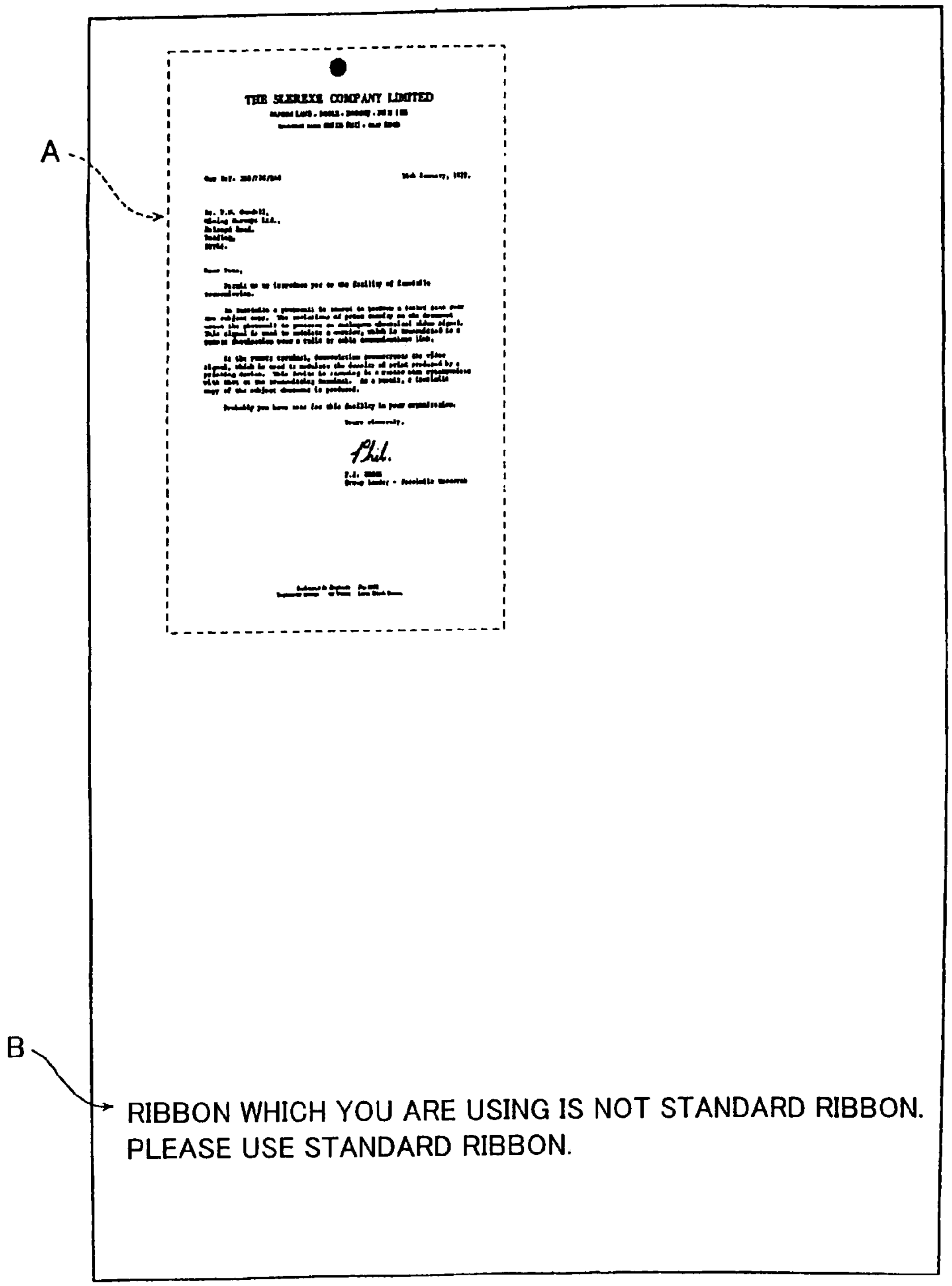
FIG. 8 shows an example of a printing result in special print processing.

As the special print processing, print data supplied from the personal computer 49 is processed and the processed print data is combined with message data informing that the presently-mounted ink ribbon R is a non-standard ink ribbon. For example, as shown in FIG. 8, a print data indicative of a document A, supplied from the personal computer 49 is reduced in size, and printed in an upper part of one sheet. Message data indicative of a message B "The ink ribbon now being used is a non-standard ink ribbon. Please use a standard ink ribbon." is printed in a lower part of the same sheet.

Instead, as shown in FIG. 9, the entire document A can be printed in a print density lower than that in the normal printing of S12 or S18.

Alternatively, as shown in FIG. 10, the entire document A may be printed with an X mark written over thereon.

Although not shown in the drawings, the document A may be printed in a manner that characters in even-numbered rows are not printed but characters in odd-numbered rows only are printed.

The document A may be printed reversely in the left and right directions as if the document A is seen from a back of a sheet.

Print data for the document A can be subjected to other various processings that can inform the user that the presently-mounted ink ribbon R is a non-standard one.

Because the desired document is processed and printed in this way, the user can recognize that the presently-mounted non-standard ink ribbon should be replaced with a standard ink ribbon.

As described above, the ribbon cassette 19 is internally mounted with the ink ribbon set S. The ink ribbon set S has the ink ribbon R and the winding shaft 24 and the supply shaft 23, which is provided with the EEPROM 25 storing ribbon-ID data of the ink ribbon R. The ink ribbon cassette 19 is detachably mounted in the facsimile apparatus 1. The facsimile apparatus 1 detects whether or not an ink ribbon R internally mounted in the ribbon cassette 19 mounted in the apparatus 1 is a standard ink ribbon (S1) When the apparatus 1 detects a non-standard ink ribbon, the apparatus 1 notifies a user by printing a message informing that the presently-mounted ink ribbon is not a standard one and that printing function with the presently-mounted ink ribbon will be disabled after elapse of an allowable time t (S8). Therefore, it is possible to notify a user the use of a non-standard ink ribbon more is appropriately and more sufficiently than the case where the message is simply displayed on a display section.

In addition, the facsimile apparatus 1 sets the length of the print allowable period t, during which normal printing is allowed, according to how the user uses the non-standard ink ribbon R. When the set allowable period t has elapsed, the apparatus 1 informs the user by printing a message informing that printing is now prohibited or disabled. By setting such a print allowable period, the facsimile apparatus 1 can give a sort of grace period to the user. Thus, the apparatus 1 is user-friendly because the apparatus does not disable the printing function immediately when a non-standard ink ribbon is mounted in the apparatus 1.

<Modifications>

In the above-mentioned embodiment, the apparatus 1 judges whether or not an ink ribbon is a standard ink ribbon by reading ribbon-ID data from the EEPROM 25 via the conductor patterns 28 of the substrate 26 provided in the ribbon cassette 19. However, the apparatus 1 may judge whether or not an ink ribbon R is a standard ink ribbon by simply detecting whether or not predetermined conductor patterns 28 are provided on the substrate 26. This modification can be employed when ink ribbon sets S mounted with standard ink ribbons R have such substrates 26 formed with the predetermined conductor patterns 28 but ink ribbon sets S mounted with non-standard ink ribbons R fail to have such substrates 26 formed with the predetermined conductor patterns 28.

While the invention has been described in detail with reference to the specific embodiment thereof, it would be apparent to those skilled in the art that various changes and modifications may be made therein without departing from the spirit of the invention.

For example, the above-described embodiment may be modified so that print operation will be always executed regardless of whether data to be printed is facsimile data or print data supplied from the personal computer 49. That is, S15 may be omitted so that the processing always proceeds from S14 to S12. In this case, a message "The presently mounted ink ribbon is not a standard ink ribbon" will be printed in S8, S14, S16, and S19.

The facsimile apparatus 1 may be modified so that a user can operate the operation section 45 to switch the mode of the facsimile apparatus 1 into a release mode, in which the initial setting processing of FIG. 6 is not executed even when the power switch 45*a* is turned on or the main body cover 22 is closed from its opened state and in which only the normal printing process of S12 is executed in the print process of FIG. 7 but the processes of S11, S13-S19 are not executed. In this case, the print operation will always be executed even if the user continues using a non-standard ink ribbon.

The internal structure of the facsimile apparatus 1 is not limited to that described in the above-described embodiment, In addition, a medium in which ribbon-ID data is stored is not limited to the EEPROM 25.

In addition, the conductor patterns 28 on the piece of substrate 26 are not limited to the structure described in the above-described embodiment.

In the above-described embodiment, ribbon-ID data is used to judge whether an ink ribbon R is a standard on or not. However, the ribbon-ID data may be used to judge whether a ribbon cassette 19 mounted with the ink ribbon R is a standard one or not. Another set of cassette-ID data may be prepared for identifying the ribbon cassette 19 and may be used for judging whether the ribbon cassette 19 is a standard one or not.

The present invention can be applied not only to an ink ribbon R but also to other consumable items for printing apparatuses, such as an ink cartridge for an ink jet printer, a toner cartridge for a laser printer, and a photosensitive drum unit for a laser printer.

Besides the facsimile apparatus, the printing apparatus of the present invention can be applied to other various printing apparatuses in which a printing component can be mounted and which have a printing function.

According to the above-described embodiment, ribbon-ID is stored in the EEPROM 25, and the facsimile apparatus 1 reads out the ribbon-ID from the EEPROM 25 and analyzes the ribbon-ID. The ribbon-ID may be prepared to include not only the manufacture lot number and the serial number but also various kinds of information concerning the ribbon R, such as a date of manufacture, a name of a manufacturing factory, a line number, and characteristic values of ink and the ink ribbon R.

Further, the EEPROM 25 may store any information of the ribbon R. The facsimile apparatus 1 reads out the information from the EEPROM 25 and analyzes the information and notifies a user of the information. Consequently, the user can learn necessary information concerning the ribbon R. That is, the CPU 31 may analyze the information (characteristic value of an ink ribbon, for example) in the judgment step of S1 instead of judging whether or not the ribbon R is a standard product, and display a result of the analysis in S8.

It is noted that after an ink ribbon set S with a standard ink ribbon R is provided to a user, it will possibly be found later that the quality of the standard ink ribbon R is inferior. Even in such a case, the facsimile apparatus 1 of the above-described embodiment can inform the user that the ink ribbon R is defective.

It is now assumed that a design of a standard ribbon R is changed and that it is found later that the product with the new design has inappropriate quality (melting temperature of ink, for example). In such a case, the facsimile apparatus 1 of the embodiment can inform the user of this fact.

More specifically, when it is found that the subject ribbon has inferior quality, an operator (maintenance-service operator) manually operates the facsimile machine 1 to write in the ROM 35 reference data indicating that the subject ink ribbon R is defective. When the defective ink ribbon R is mounted to the facsimile machine 1 thereafter, the facsimile apparatus 1 will inform the user that the mounted ribbon is defective in S8. It is noted that the reference data may be inputted into the ROM 35 by a remote control away from a host apparatus (call center).

The printing apparatus of the present invention are widely used for home and office uses.

What is claimed is:

1. A printing apparatus, comprising:

a mounting unit, in which a printing component is detachably mounted, the printing component being detachably mounted with a consumable item and having a storage portion storing information of the consumable item;

a printing unit that uses the consumable item in the printing component mounted in the mounting section to execute printing operation;

a detecting unit that detects the information stored in the storage portion and executes a judging operation based on the detected information; and a printing-notifying unit that prints a message selectively based on the judged result, the message showing the judged result, thereby informing a user of the judged result, wherein the printing-notifying unit includes: an instruction input portion that receives an instruction for printing and print data indicative of an image desired to be printed; and a processing unit that, upon receipt of the printing instruction and the print data, processes the received print data selectively based on the judged result; wherein the printing unit prints the processed print data onto a sheet of paper.

2. A printing apparatus according to claim 1, wherein the processing unit combines the received print data and message data indicative of the message showing the judged result, the printing unit printing the combined data onto a single sheet of paper.

3. A printing apparatus according to claim 1, wherein the detecting unit determines, based on the detected information, to prohibit the printing unit to execute printing operation by using the mounted consumable item;

wherein the printing-notifying unit prints, when the detecting unit determines to prohibit the printing unit to execute printing operation, a message showing that printing with the presently-mounted consumable item will be prohibited after elapse of an allowable period of time.

4. A printing apparatus according to claim 3, further comprising a printing prohibiting unit that starts, based on the determination by the detecting unit to prohibit the printing unit from executing printing operation, prohibiting the printing unit from executing printing operation when the allowable period of time has elapsed after the detecting unit makes the determination.

5. A printing apparatus according to claim 4, further comprising a setting unit that sets a length of the print allowable period.

6. A printing apparatus according to claim 5, further comprising a counting unit that counts the number of times the detecting unit has determined to prohibit the printing unit from executing the printing operation, the setting unit setting the length of the print allowable period dependently on the counted time number in a manner that the length of the print allowable period decreasing stepwisely according to increase of the counted time number.

7. A printing apparatus according to claim 6, wherein the printing-notifying unit prints, when the allowable period of time has elapsed after the detecting unit makes the determination to prohibit the printing unit to execute printing operation, a message showing that printing with the presently-mounted consumable item is being prohibited.

8. A printing apparatus according to claim 1, wherein the storage portion stores identification information identifying the consumable item, wherein the detecting unit detects the identification information and judges whether or not the mounted consumable item is a predetermined standard consumable item whose characteristic satisfies a predetermined standard, and wherein the printing-notifying unit prints, when the detecting unit determines that the mounted consumable item is not a standard consumable item, the message showing that the consumable item is not a standard consumable item.

9. A printing apparatus according to claim 8, wherein the consumable item is an ink ribbon set, the ink ribbon set including:

an ink ribbon coated with ink;

a supply shaft, around of which the ink ribbon is wound, the storage portion being provided to the supply shaft; and a winding shaft that takes up the ink ribbon from the supply shaft, and wherein the printing component includes a ribbon cassette frame, to which the ink ribbon set is detachably mounted in a manner that the supply shaft and the winding shaft are rotatably supported to the ribbon cassette frame.

10. A printing apparatus according to claim 1, wherein:

when the detecting unit detects that the information stored in the storage portion indicates a normal condition, the processing unit processes the received print data with a normal processing; and when the detecting unit detects that the information stored in the storage portion indicates an abnormal condition, the processing unit processes the received print data with a special processing that is different from the normal processing.

11. The printing apparatus according to claim 10, wherein the special processing includes printing the received print data in a reduced size.

12. The printing apparatus according to claim 10, wherein the special processing includes printing the received print data with reduced density.

13. The printing apparatus according to claim 10, wherein the special processing includes printing the received print data with a mark superimposed thereon, the mark indicating an abnormal condition.

14. The printing apparatus according to claim 13, wherein the mark is an “X” symbol substantially overlapping an entirety of the image of the received print data.

15. The printing apparatus according to claim 1, wherein the special processing includes printing the received print data backwards.

16. The printing apparatus according to claim 1, wherein the special processing includes printing the received print with skipped rows.

17. A printing apparatus, comprising:

a mounting unit, in which a printing component is detachably mounted, the printing component being detachably mounted with a consumable item and having a storage portion storing information of the consumable item;

a printing unit that uses the consumable item in the printing component mounted in the mounting section to execute printing operation;

a detecting unit that detects the information stored in the storage portion and executes a judging operation based on the detected information; and a printing-notifying unit that prints a message selectively based on the judged result, the message showing the judged result, thereby informing a user of the judged result, wherein the detecting unit determines, based on the detected information, to prohibit the printing unit to execute printing operation by using the mounted consumable item; and wherein the printing-notifying unit prints, when the detecting unit determines to prohibit the printing unit to execute printing operation, a message showing that printing with the presently-mounted consumable item will be prohibited after elapse of an allowable period of time, the printing apparatus further comprising:

a printing prohibiting unit that starts, based on the determination by the detecting unit to prohibit the printing unit from executing printing operation, prohibiting the printing unit from executing printing operation when the allowable period of time has elapsed after the detecting unit makes the determination;

a setting unit that sets a length of the print allowable period; and a counting unit that counts the number of times the detecting unit has determined to prohibit the printing unit from executing the printing operation, the setting unit setting the length of the print allowable period dependently on the counted time number in a manner that the length of the print allowable period decreasing stepwisely according to increase of the counted time number.

18. The printing apparatus according to claim 17, wherein the processing unit combines the received print data and message data indicative of the message showing the judged result, the printing unit printing the combined data onto a single sheet of paper.

19. The printing apparatus according to claim 17, wherein the printing-notifying unit prints, when the allowable period of time has elapsed after the detecting unit makes the determination to prohibit the printing unit to execute printing operation, a message showing that printing with the presently-mounted consumable item is being prohibited.

20. The printing apparatus according to claim 17, wherein the storage portion stores identification information identifying the consumable item, wherein the detecting unit detects the identification information and judges whether or not the mounted consumable item is a predetermined standard consumable item whose characteristic satisfies a predetermined standard, and wherein the printing-notifying unit prints, when the detecting unit determines that the mounted consumable item is not a standard consumable item, the message showing that the consumable item is not a standard consumable item.

21. The printing apparatus according to claim 20, wherein the consumable item is an ink ribbon set, the ink ribbon set including:

an ink ribbon coated with ink;

a supply shaft, around of which the ink ribbon is wound, the storage portion being provided to the supply shaft; and a winding shaft that takes up the ink ribbon from the supply shaft, and wherein the printing component includes a ribbon cassette frame, to which the ink ribbon set is detachably mounted in a manner that the supply shaft and the winding shaft are rotatably supported to the ribbon cassette frame.

* * * * *